W. SMITH.
SUPPORTING THILLS.

No. 188,200.                  Patented March 6, 1877.

WITNESSES
Henry N. Miller
C. L. Evert

INVENTOR
Wm Smith
By Alexander Mason
Attorneys

UNITED STATES PATENT OFFICE.

WILLIAM SMITH, OF CICERO, INDIANA.

IMPROVEMENT IN SUPPORTING THILLS.

Specification forming part of Letters Patent No. 188,200, dated March 6, 1877; application filed August 12, 1876.

*To all whom it may concern:*

Be it known that I, WM. SMITH, of Cicero, in the county of Hamilton, and in the State of Indiana, have invented certain new and useful improvements in device for holding carriage-shafts in an elevated position; and do hereby declare that the following is a full, clear, and exact description thereof, reference being had to the accompanying drawings, and to the letters of reference marked thereon, making part of this specification.

The nature of my invention consists in the construction and arrangement of a device for holding carriage-shafts in an elevated position, as will be hereinafter more fully set forth.

In order to enable others skilled in the art to which my invention appertains to make and use the same, I will now proceed to describe its construction and operation, referring to the annexed drawing, in which—

Figure 1:
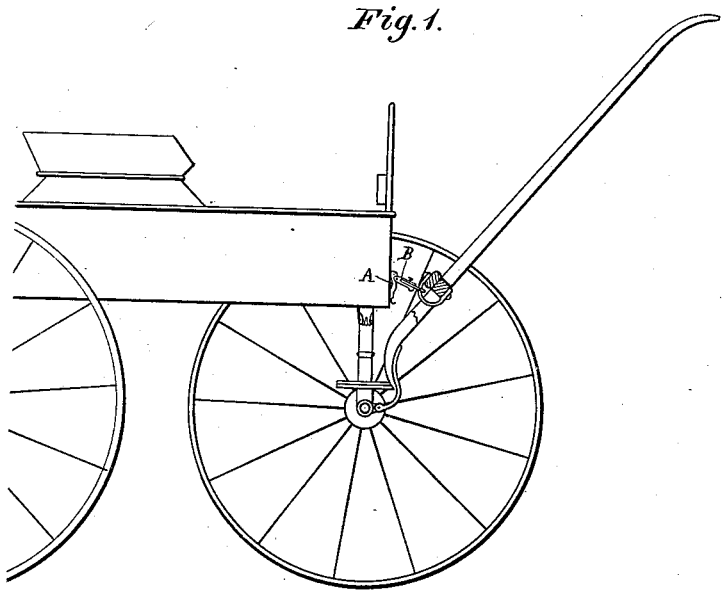
Figure 2:
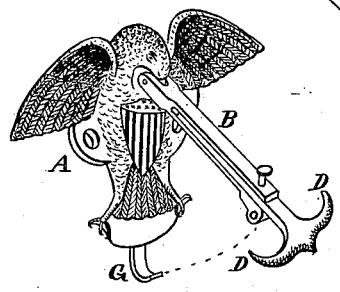
Figure 3:
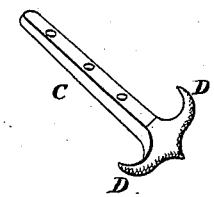

Figure 1 is a side elevation of a carriage, showing the application of my invention. Fig. 2 is an enlarged perspective view of my invention. Fig. 3 shows a part thereof.

A represents an ornamental plate to be fastened to the front of the carriage. This plate I have shown in the form of an eagle; but it may be made in any desired form and size, as that is simply a matter of taste.

To the plate A is hinged a bar, B, the upper or inner end of which is forked and hinged by a horizontal pin, so that the bar can be raised or lowered, as required. This bar B is slotted longitudinally from its outer end inward for a suitable distance.

In this slot is pivoted an arm, C, said pivot running at right angles with the axis of the hinge of the bar B. The outer end of the arm C is formed with hooks D D, one on each side, as shown, and in the body of the arm are several holes, so that the arm may be extended or drawn in, as required, to suit the vehicle upon which the device is to be used.

When the shafts are raised to their utmost capacity, either one of the hooks D is caught in the stirrup or loop on the whiffletree, which holds the shafts in an upright position.

The shafts can easily be unhooked and lowered when the bar D, with the arm, drops down perpendicularly of its own weight, and is caught by a spring, G, at the lower edge of the plate A, thereby preventing all rattling.

Having thus fully described my invention, what I claim as new, and desire to secure by Letters Patent, is—

The combination of the perforated arm C, with hooks D D, and the longitudinally slotted bar B, hinged to a bed-plate, A, and having the arm C pivoted in it, substantially as and for the purposes herein set forth.

In testimony that I claim the foregoing I have hereunto set my hand this 1st day of July, 1876.

WM. SMITH.

Witnesses:
JOHN H. MILLER,
F. G. SARCHETT.